US012766771B2

(12) United States Patent
Kwon

(10) Patent No.: US 12,766,771 B2
(45) Date of Patent: Oct. 20, 2026

(54) METHOD OF MANUFACTURING PTC HEATING ELEMENT, AND PTC HEATING ELEMENT MANUFACTURED THEREBY

(71) Applicant: PUKYONG NATIONAL UNIVERSITY INDUSTRY-UNIVERSITY COOPERATION FOUNDATION, Busan (KR)

(72) Inventor: Hansang Kwon, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 114 days.

(21) Appl. No.: 18/541,192

(22) Filed: Dec. 15, 2023

(65) Prior Publication Data

US 2024/0208127 A1 Jun. 27, 2024

(30) Foreign Application Priority Data

Dec. 27, 2022 (KR) ........................ 10-2022-0186114

(51) Int. Cl.

*B29C 48/00* (2019.01)
*B29C 48/05* (2019.01)

(Continued)

(52) U.S. Cl.

CPC ............ *B29C 48/022* (2019.02); *B29C 48/05* (2019.02); *H05B 3/145* (2013.01); *H05B 3/146* (2013.01);

(Continued)

(58) Field of Classification Search

CPC ... B29C 48/05; B29C 48/022; H05B 2203/02; H05B 2203/017; H05B 3/145; H05B 3/146

See application file for complete search history.

(56) References Cited

U.S. PATENT DOCUMENTS 4,885,457 A * 12/1989 Au ...................... B29C 48/0022 219/505
5,113,058 A * 5/1992 Srubas .................. H05B 3/146 252/511

(Continued)

FOREIGN PATENT DOCUMENTS

CN 103333388 A 10/2013
EP 3809600 A1 * 4/2021 ............ H05B 3/286

(Continued)

*Primary Examiner* — Seyed Masoud Malekzadeh
(74) *Attorney, Agent, or Firm* — Dinsmore & Shohl LLP; Yongsok Choi, Esq.

(57) ABSTRACT

Proposed is a method of manufacturing a PTC heating element, the method including: (a) preparing a mixed powder of a polymer powder and a carbon nanotube-containing powder, (b) forming the mixed powder into a pellet-shaped body, and (c) extruding the pellet-shaped body to produce a wire-type heating element. A PTC heating element manufactured by the method is also proposed. The PTC heating element manufactured by the method has better thermal conductivity than existing PTC heating elements, so that the PTC heating element exhibits a quick temperature rise within a short time, resulting in a reduction in power consumption. In particular, when the PTC heating element is used as a heating element for car seat heaters and steering wheel heaters in electric vehicles, battery consumption may be dramatically reduced, contributing to an increase in the driving mileage of the electric vehicles.

8 Claims, 5 Drawing Sheets

(51) Int. Cl.

| | |
|---|---|
| ***H05B 3/14*** | (2006.01) |
| *B29K 27/18* | (2006.01) |
| *B29K 507/04* | (2006.01) |
| *B29L 31/00* | (2006.01) |

(52) U.S. Cl.

CPC ...... *B29K 2027/18* (2013.01); *B29K 2507/04* (2013.01); *B29L 2031/779* (2013.01); *H05B 2203/017* (2013.01); *H05B 2203/02* (2013.01)

(56) References Cited

U.S. PATENT DOCUMENTS

| | | | | | |
|---|---|---|---|---|---|
| 5,164,133 | A * | 11/1992 | Ishida | B29C 48/832 | 264/105 |
| 5,814,264 | A * | 9/1998 | Cai | B29C 48/022 | 264/408 |
| 6,306,323 | B1 * | 10/2001 | Chu | B29C 48/08 | 425/149 |
| 8,968,605 | B2 * | 3/2015 | Yue | C08K 3/04 | 252/511 |
| 2009/0314765 | A1 * | 12/2009 | Feng | H05B 3/145 | 219/520 |
| 2010/0084161 | A1 * | 4/2010 | Neal | B29C 48/022 | 174/126.1 |
| 2010/0316821 | A1 * | 12/2010 | Chang | B32B 3/30 | 428/35.8 |
| 2013/0140499 | A1 * | 6/2013 | Yue | C08K 3/04 | 252/511 |

FOREIGN PATENT DOCUMENTS

| | | | | |
|---|---|---|---|---|
| KR | 101999949 B1 | | 7/2019 | |
| WO | WO-2017114334 A1 | * | 7/2017 | F16K 11/12 |

* cited by examiner

| Composite | Sintering condition | Top view |
|---|---|---|
| Teflon | 360°C, 100MPa, 5min |  |
| Teflon-3vol.%CNT | 360°C, 100MPa, 5min |  |

| Composite | Sintering condition | Top view |
|---|---|---|
| Teflon-Al-0.2%CNT | 365°C, 100MPa, 5min |  |
| Teflon-Al-1%CNT | |  |
| Teflon-Al-5%CNT | |  |
| Teflon-Al-10%CNT | |  |
| Teflon-Al-15%CNT | |  |
| Teflon-Al-20%CNT | |  |

METHOD OF MANUFACTURING PTC HEATING ELEMENT, AND PTC HEATING ELEMENT MANUFACTURED THEREBY

CROSS REFERENCE TO RELATED APPLICATION

The present application claims priority to Korean Patent Application No. 10-2022-0186114, filed Dec. 27, 2022, the entire contents of which is incorporated herein for all purposes by this reference.

BACKGROUND OF THE DISCLOSURE

1. Field of the Disclosure

The present disclosure relates to a method of manufacturing a positive temperature coefficient (PTC) heating element and to a PTC heating element manufactured by the method.

2. Description of the Related Art

Positive temperature coefficient (PTC) heating elements with a self-temperature control function are used for car seat heaters and steering wheel heaters. Such PTC heating elements have the disadvantages of having poor flexibility and taking a relatively long time for the temperature thereof to rise. This limits the shape of applied parts and heavily consumes power due to the long time it takes for the temperature thereof to rise.

SUMMARY OF THE DISCLOSURE

The present disclosure is to provide a method of manufacturing a PTC heating element having better flexibility and thermal conductivity leading to a quicker temperature rise and lesser power consumption than existing PTC heating elements. Additionally, the present disclosure is to provide a PTC heating element manufactured by the method.

To accomplish the goals, in one aspect, the present disclosure proposes a method of manufacturing a PTC heating element, the method including: (a) preparing a mixed powder of a polymer powder and a carbon nanotube-containing powder, (b) forming the mixed powder into a pellet-shaped body, and (c) extruding the pellet-shaped body to produce a wire-type heating element.

In the method, the polymer may be (i) a thermoplastic resin selected from fluorine-based resins, acrylic resins, olefin-based resins, vinyl resins, and styrene-based resins, or (ii) a thermosetting resin selected from phenol resins, epoxy resins, and polyimide resins.

In the method, the polymer may be at least one fluorine-based resin selected from polytetrafluoroethylenes (PTFEs), polychlorotrifluoroethylenes (PCTFEs), polyvinylidene-fluorides (PVDFs), polyvinylfluorides (PVFs), perfluoro-alkoxy fluororesins (PFAs), and ethylene chlorotrifluoroethylenecopolymers (ECTFEs).

In the method, the mixed powder may include 97% by volume of polytetrafluoroethylene (PTFE) powder and 3% by volume of carbon nanotube powder.

In the method, the carbon nanotube-containing powder may be a powder of a composite material obtained by the complexation of a carbon nanotube and a metal.

In the method, the metal may be any one or an alloy of two or more metals selected from the group consisting of Al, Cu, Ti, Mg, K, Ca, Sc, V, Cr, Mn, Fe, Co, Ni, Zn, Ga, Rb, Sr, Y, Zr, Mo, Ru, Rh, Pd, Ag, Cd, In, Sn, Cs, Ba, La, Ce, Nd, Sm, Eu, Gd, Tb, W, Cd, Sn, Hf, Ir, Pt, and Pb.

In the method, the method may be aluminum or an alloy of aluminum.

In the method, the mixed powder may include 97% by volume of polytetrafluoroethylene (PTFE) powder and 3% by volume of aluminum/carbon nanotube composite powder.

In the method, the aluminum/carbon nanotube composite powder may include 70% to 99.8% by volume of aluminum and 0.2% to 30% by volume of carbon nanotubes.

In step (b) of the method, the pellet-shaped body may be produced by charging the mixed powder into a mold and applying heat and pressure thereto.

In step (b) of the method, the pellet-shaped body may be produced by kneading and extruding the mixed powder.

Furthermore, in another aspect, the present disclosure proposes a PTC heating element manufactured by the manufacturing method.

According to the present disclosure, the PTC heating element manufactured by the method has better thermal conductivity than the existing PTC heating elements, so that the PTC heating element manufactured by the method exhibits a quick temperature rise within a short time, resulting in a reduction in power consumption. In particular, when the PTC heating element is used as a heating element for car seat heaters or steering wheel heaters in electric vehicles, battery consumption can be dramatically reduced, contributing to an increase in the driving mileage of the electric vehicles.

DETAILED DESCRIPTION

In the following description of the present disclosure, detailed descriptions of known functions and components incorporated herein will be omitted when it may make the subject matter of the present disclosure unclear.

Reference will now be made in detail to various embodiments of the present disclosure, specific examples of which are illustrated in the accompanying drawings and described below since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments but also various alternatives, modifications, equivalents, and other embodiments that may be included within the spirit and scope of the present disclosure as defined by the appended claims.

The terminology used herein only describes particular embodiments and is not intended to be limiting. As used herein, the singular forms are intended to include the plural forms as well, unless the context clearly indicates otherwise. It will be further understood that the terms "comprise", "include", and "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the present disclosure will be described in detail.

Figure 1:
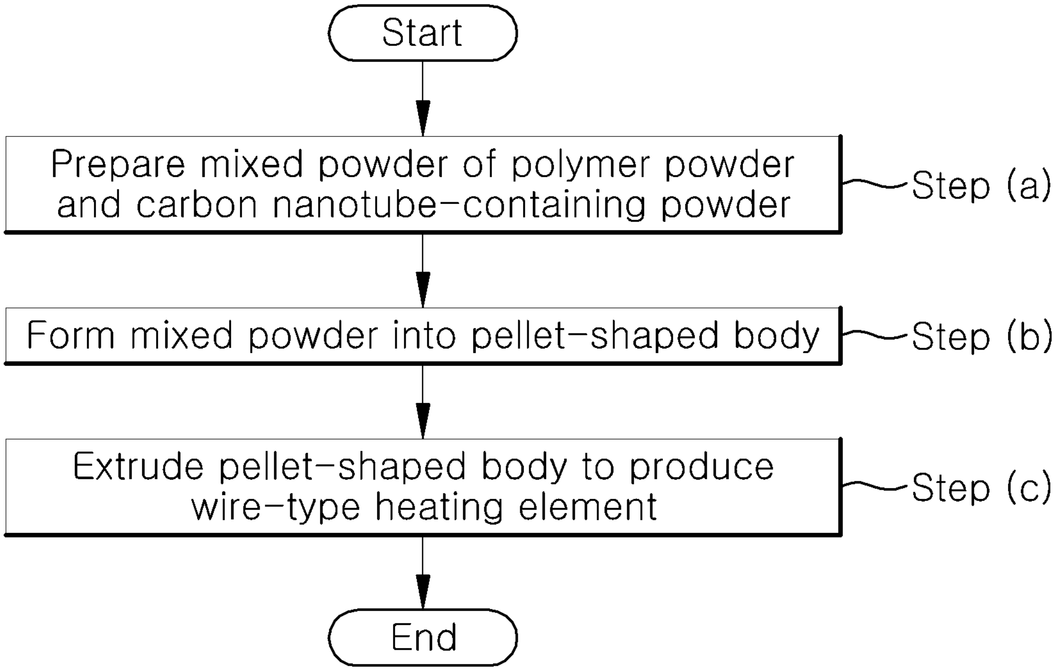
FIG. 1 is a process flowchart illustrating a method of manufacturing a PTC heating element according to the present disclosure.

The present disclosure provides a method of manufacturing a PTC heating element. The method includes (a) preparing a mixed powder of a polymer powder and a carbon nanotube-containing powder, (b) forming the mixed powder into a pellet-shaped body, and (c) extruding the pellet-shaped body to manufacture a wire-type heating element (see FIG. 1).

In step (a), the polymer powder and the carbon nanotube-containing powder are mixed through various types of ball milling processes such as electric ball milling, agitated ball milling, and planetary ball milling to prepare a homogeneous mixed powder. For example, a low-energy milling process using a conventional electric ball milling device may be performed at a speed in a range of 100 to 500 rpm for 1 to 20 hours to prepare a mixed powder of polymer and carbon nanotube-containing powder. At this time, the polymer powder is made of thermoplastic resins or thermosetting resins.

Examples of the thermoplastic resin may include olefin-based resins such as polyethylene, polypropylene, and poly-4-methylpentene-1; acrylic resins such as polymethylmethacrylate and acrylonitrile; vinyl-based resins such as polyvinylchloride, polyvinylacetate, polyvinylalcohol, polyvinyl butyral, and polyvinyldenumchloride; styrene-based resins such as polystyrene and ABS resin; fluorine resins such as tetrafluoroethyleneresin, trifluoroethyleneresin, polyvinyldenumfluoride, and polyvinylfluoride; and cellulose-based resins such as nitrocellulose, ceroloseacetate, ethylcellulose, and propylene cellulose in addition to polyamide, polyamideimide, polyacetal, polycarbonate, polyethylenebutarate, polybutylenebutarate, ionomoresin, polysulfone, polyethersulfone, polyphenyleneether, polyphenylenesulfide, polyetherimide, polyetheretherketone, and aromatic polyester (econol, polyarylate).

Additionally, examples of the thermosetting resins may include phenol resins, epoxy resins, and polyimide resins.

More specifically, when the polymer is a fluorine-based resin (also called fluoropolymer), the polymer includes at least one selected from polytetrafluoroethylenes (PTFEs) widely known under the trade name of Teflon, polychlorotrifluoroethylenes (PCTFES), and polyvinylidenefluorides (PVDFs), polyvinylfluorides (PVFs), perfluoroalkoxy fluororesins (PFAs), and ethylene chlorotrifluoroethylenecopolymers (ECTFEs).

For reference, fluorine-based resins have high chemical resistance and electrical insulation, have a very low surface friction coefficient, and have stable incombustibility even in high-temperature environments, so they are widely used as engineering plastics.

Meanwhile, the carbon nanotube-containing powder mixed with the polymer powder in step (a) is preferably a powder made of a composite material (carbon nanotube-reinforced metal composite material) obtained by the complexation of a carbon nanotube and a metal.

At this time, the metal complexed with the carbon nanotube may be any one or an alloy of two or more metals selected from the group consisting of Al, Cu, Ti, Mg, K, Ca, Sc, V, Cr, Mn, Fe, Co, Ni, Zn, Ga, Rb, Sr, Y, Zr, Mo, Ru, Rh, Pd, Ag, Cd, In, Sn, Cs, Ba, La, Ce, Nd, Sm, Eu, Gd, Tb, W, Cd, Sn, Hf, Ir, Pt, and Pb.

For example, when the metal is aluminum or its alloy, the metals may be any one of the aluminum or its alloys selected from the group consisting of metals in 1000 series, 2000 series, 3000 series, 4000 series, 5000 series, 6000 series, 7000 series, and 8000 series.

The powder obtained by the complexation of the carbon nanotube and a metal may be prepared through a ball milling process such as electric ball milling, agitated ball milling, or planetary ball milling in the complexation. At this time, the ball milling process is performed under air or an inert atmosphere. For example, the process may be performed under a nitrogen or argon atmosphere and at a low speed of 150 r/min to 300 r/min or a high speed of 300 r/min or more for 12 to 48 hours.

Furthermore, the mixed powder may further include thermally conductive composite particles containing 69 to 95% by weight of aluminum hydroxide, 4 to 30% by weight of boron nitride, and 1 to 2% by weight of an organosiloxane compound to further improve the thermal conductivity of the finally manufactured heating element. For example, the mixed powder may include 5 to 30 parts by volume of the thermally conductive composite particles based on 100 parts by volume of the mixed powder of the polymer powder and the carbon nanotube-containing powder.

At this time, the organosiloxane compound is preferably a compound represented by $(R_2SiO)_x$ (R is a substituted or unsubstituted methyl group, and x is 1 to 20).

In addition, the thermally conductive composite particles may be prepared by (i) stirring, mixing, and heat treating 69 to 95% by weight of aluminum hydroxide, 4 to 30% by weight of boron nitride, and 1 to 2% by weight of an organosiloxane compound for complexation before cooling the mixture.

In addition, the mixed powder further includes thermally conductive composite particles having a dispersed structure with at least one thermally conductive ceramic selected from boronnitride, alumina, and aluminumnitride and matrixes made of polyester or polyimide to double the thermal conductivity of the finally manufactured heating element. For example, the mixed powder may include 5 to 30 parts by volume of the thermally conductive composite particles based on 100 parts by volume of the mixed powder of the polymer powder and the carbon nanotube-containing powder.

At this time, the thermally conductive composite particles may include 10 to 20 parts by weight of thermally conductive ceramic and 1 to 5 parts by weight of graphene oxide based on 100 parts by weight of polyester or polyimide.

In addition, the thermally conductive polymer particles may be prepared sequentially by (i) preparing a first mixed solution containing at least one thermally conductive ceramic selected from boronnitride, alumina, and aluminum nitride and a silane coupling agent, (ii) preparing a second mixed solution containing graphene oxide and isocyanate, (iii) mixing the first mixed solution and the second mixed solution to chemically bond the thermally conductive ceramic and graphene oxide for composition preparation by the mediation of a silane coupling agent and isocyanate, and (iv) mixing and polymerizing the composition, polyester, or a polyimide precursor, and an antioxidant to prepare thermally conductive composite particles.

At this time, the isocyanate is preferably a compound selected from the group consisting of diphenylmethane diisocyanate, toluene diisocyanate, hexamethylene diisocyanate, and a combination of diphenylmethane diisocyanate, toluene diisocyanate, and hexamethylene diisocyanate, and the silane coupling agent is preferably represented by $R—(CH_2)_2—Si(OCH_3)_3$ (R is an amino group, epoxy group, or vinyl group).

Next, step (b) is to produce a shaped body from the mixed powder prepared in step (a) which means to produce a pellet-shaped body from the mixed powder.

For example, in step (b), the pellet-shaped body may be produced by charging the mixed powder of the polymer powder and the carbon nanotube-containing powder into a mold and applying heat and pressure thereto.

When the shaped body is produced by applying heat and pressure as described above, a spark plasma sintering device or a hot pressure sintering device may be used, but any sintering device may be used as long as it achieves the same objective. However, when precise sintering in a short time is required, it is preferable to use discharge plasma sintering. In this case, discharge plasma sintering may be carried out under a pressure in a range of 50 MPa to 150 MPa and at a temperature in a range of 3000° ° C. to 600° ° C. for 1 second to 30 minutes.

Hereinafter, the present disclosure will be described in more detail with reference to embodiments.

Embodiments according to the present specification may be modified into various other forms, and the scope of the present specification is not to be construed as being limited to the embodiments described in detail below. The embodiments of this specification are provided to more completely explain the present specification to those ordinarily skilled in the art.

Figure 2:
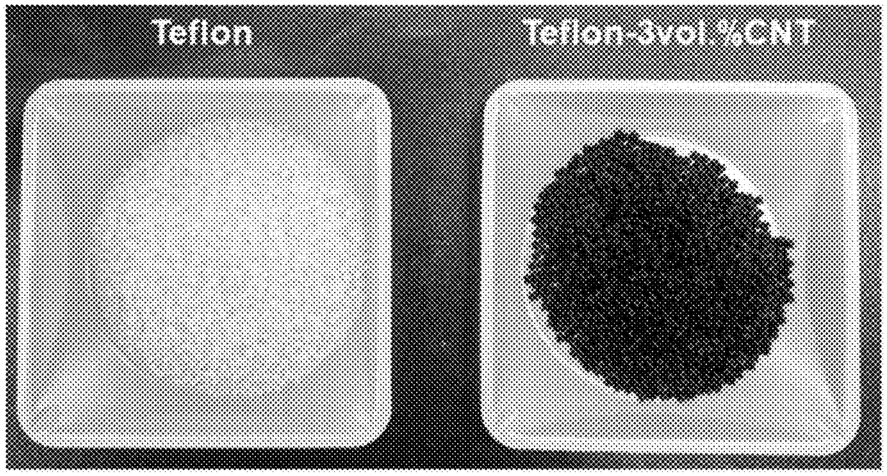
FIG. 2 is photos illustrating a polytetrafluoroethylene (PTFE) powder widely known under the trade name of Teflon and a mixed powder (Teflon-3 vol. % CNT) which contains 97% by volume of Teflon powder and 3% by volume of carbon nanotube (CNT) powder.

<Example 1> Manufacturing of a Wire-Type PTC Heating Element Containing Carbon Nanotubes and Teflon 3% by volume of carbon nanotube powder (prepared by OCSiAl Co., Ltd., Luxembourg) with a purity of 99.5%, a diameter of 10 nm, and a length of 30 μm or less and 97% by volume of Teflon powder with a particle size in a range of 0.2 to 1 mm were charged into the vial of the ball milling device, and 20 mL of heptane was added thereto. The weight ratio of the ball and the composite powder was set to 5:1, the balls were put in, and a low-energy ball milling process was performed at a speed of 230 rpm for 30 minutes to prepare a uniformly mixed powder (Teflon-3 vol. % CNT) of carbon nanotubes and Teflon (FIG. 2).

Figure 3:
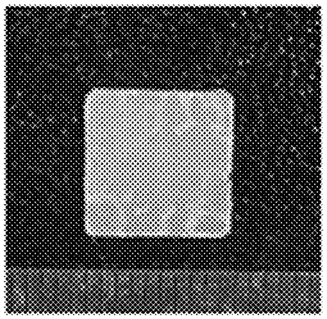
FIG. 3 is photos illustrating pellets prepared by pressure sintering of the Teflon powder (Teflon) and pellets prepared by pressure sintering of the mixed powder (Teflon-3 vol. % CNT) which contains 97% by volume of Teflon powder and 3% by volume of carbon nanotube (CNT) powder.
Figure 3:
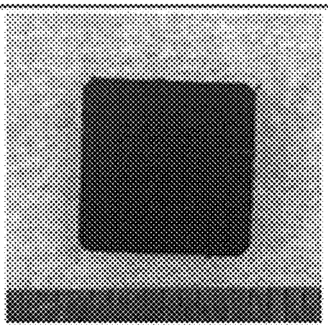

The mixed powder was charged into a mold and subjected to spark plasma sintering for 5 minutes at a temperature of 360° ° C. and under a pressure of 100 MPa to prepare a pellet made of Teflon-3 vol. % CNT (FIG. 3).

Various physical properties, including density, of the pellets made of Teflon-3 vol. % CNT prepared as above and the pellets made only of Teflon are shown in the table below.

| | Density ($g/cm^3$) Teflon: 2.200 $g/cm^3$ | | Heat capacity ($J/g \cdot K$) Teflon: 1.500 $J/g \cdot K$ | Diffusivity ($mm^2/s$) | Thermal Conductivity ($W \cdot m^{-1} \cdot K^{-1}$) | Numerical |
|---|---|---|---|---|---|---|
| Composites | Theo. ($g/cm^3$) | Exp. ($g/cm^3$) | Exp. ($J/g \cdot K$) | Exp. ($mm^2/s$) | Exp. ($W \cdot m^{-1} \cdot K^{-1}$) | Difference (base on Teflon) |
| Teflon | 2.200 | — | 1.242 | 0.098 | 0.268 | 0.103 + |
| Teflon-3 vol % CNT | 2.188 | — | 1.183 | 0.143 | 0.371 | 38.4% |

As another example, in step (b), a pellet-shaped body may be produced by kneading and extruding the mixed powder of the polymer powder and the carbon nanotube-containing powder.

Finally, in step (c), the pellet-shaped body produced in step (b) is extruded to produce a wire-shaped extruded material. The specific method for performing the extrusion process in this step is not particularly limited, for example, the extrusion process may be performed by an indirect extrusion process, a direct extrusion process, a hydrostatic extrusion process, or an impact extrusion process.

The PTC heating element manufactured by the manufacturing method described in detail above has better thermal conductivity leading to a quicker temperature rise in a short time and lesser power consumption than existing PTC heating elements. In particular, when the PTC heating element is used as a heating element for car seat heaters and steering wheel heaters in electric vehicles, battery consumption may be dramatically reduced, contributing to an increase in the driving mileage of the electric vehicles.

The pellets prepared as described above were charged into the hopper of the extrusion device and transported along a rotating screw inside the cylinder to continuously extrude a product in the shape of a circular wire rod determined by the type of a die installed at the outlet. For reference, in the process of supplying and extruding pellet materials, when heating and melting are carried out for shaping, a temperature control device using electric heat or steam may be attached.

The main parts of the extruder used in this example include a heating device that heats and plasticizes materials, a screw device that pressurizes and moves forward the plasticized materials, and a die that gives a certain shape through the die. Accessory equipment of the extruder is a conveyor that pulls out shaped products from the die at a stable speed and a device that cools, rolls out, or cuts the shaped products. Oil circulation or electric heat is used for heating. The material of the screw is required to be stronger against wear and more chemically stable than tool steel, so it is plated with hard chrome. The inner wall of the sleeve is surface-hardened.

<Example 2> Manufacturing of Wire-Type PTC Heating Element Containing Carbon Nanotube-Reinforced Aluminum Composite Material and Teflon First, carbon nanotube powder (prepared by JEIO Co., Ltd., Korea) with a purity of 99.5%, a diameter of 10 nm, and a length of 30 μm or less and aluminum powder (prepared by MetalPlayer Co., Ltd., Korea) with an average particle diameter of 45 μm and a purity of 99.8% were prepared.

80 to 99.8% by volume of aluminum powder and 0.2 to 20% by volume of carbon nanotubes were filled into a stainless steel container, and then stainless steel balls (a mixture of balls with a diameter of 20 ø and 10 ø, respectively) were filled inside the container. After 50 mL of heptane was added to the container, it was ball-milled at a low speed of 160 rpm for 24 hours using a horizontal ball mill. Afterward, the container was opened and all of the heptane was evaporated in a hood to obtain carbon nanotube-reinforced aluminum composite powder (CNT-aluminum composite powder).

Figure 4:
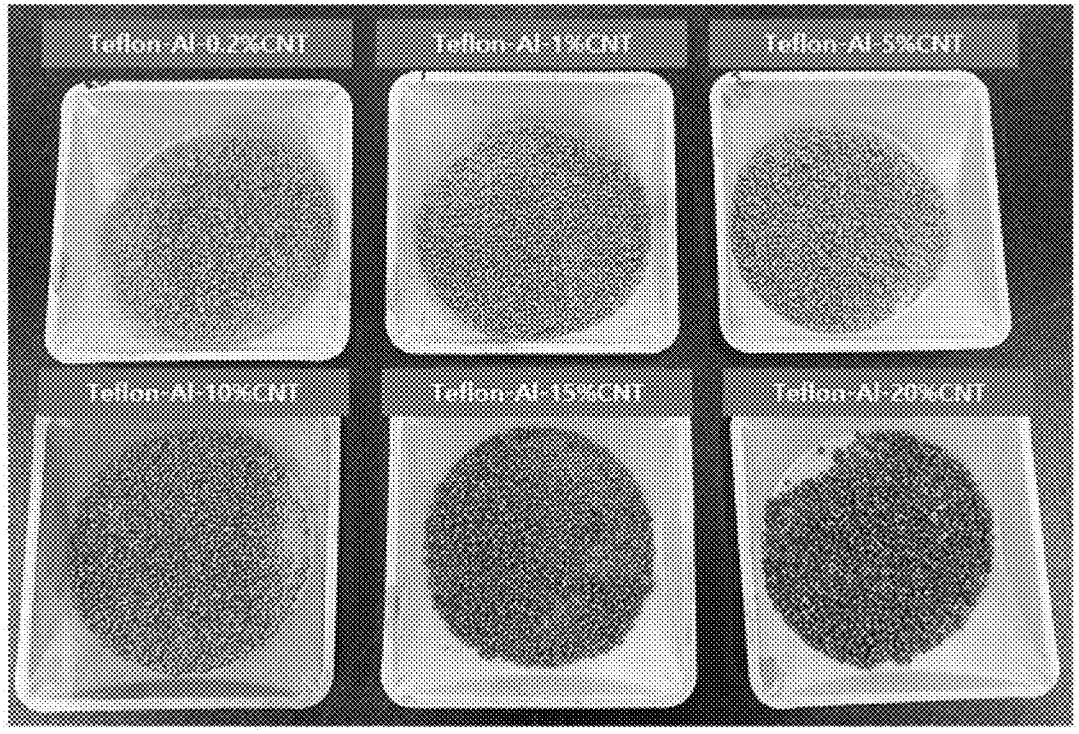
FIG. 4 is photos illustrating mixed powders containing 97% by volume of Teflon powder and 3% by volume of aluminum/carbon nanotube composite powder in which the aluminum/carbon nanotube composite powder contains 0.2% to 20% by volume of carbon nanotubes based on the total volume of the composite powder.

Next, 3% by volume of the CNT-aluminum composite powder and 97% by volume of Teflon powder with a particle size in a range of 0.2 to 1 mm were loaded into the vial of the ball milling device, and 20 mL of heptane was added thereto. The weight ratio of the balls and the composite powder was set to 5:1, the balls were introduced into the device, and a low-energy ball milling process was performed at a speed of 230 rpm for 30 minutes to prepare a uniformly mixed powder of carbon nanotubes and Teflon (Teflon-Al-xCNT [however, x is 0.2%, 18, 5%, 10%, 15% or 20%]) (FIG. 4).

Figure 5:
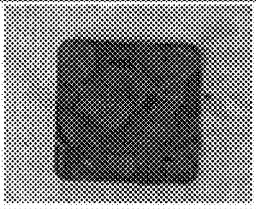
FIG. 5 is photos illustrating pellets prepared by pressure sintering of the mixed powders of the Teflon powder and pellets prepared by pressure sintering of the aluminum/carbon nanotube composite powder shown in FIG. 4.
Figure 5:
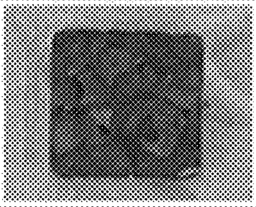
Figure 5:
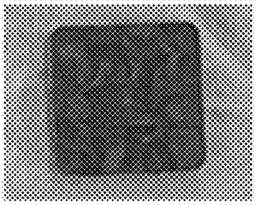
Figure 5:
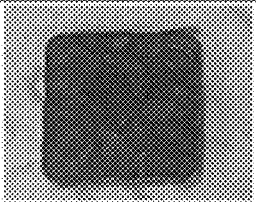
Figure 5:
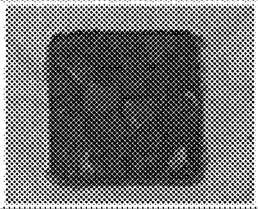
Figure 5:
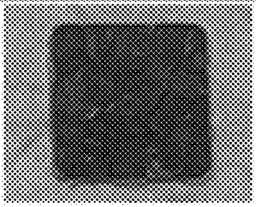

The mixed powder was charged into a mold and subjected to spark plasma sintering for 5 minutes at a temperature of 360° C. and under a pressure of 100 MPa to prepare pellets made of Teflon-Al-xCNT (FIG. 5).

Various physical properties, including density, of each pellet made of Teflon-Al-xCNT prepared as above are shown in the table below.

| | Density ($g/cm^3$) Teflon: 2.200 $g/cm^3$ | | Heat capacity ($J/g \cdot K$) Teflon: 3.500 $J/g \cdot K$ | Diffusivity ($mm^2/s$) | Thermal Conductivity ($W \cdot m^{-1} \cdot K^{-1}$) |
|---|---|---|---|---|---|
| Composites | Theo. ($g/cm^3$) | Exp. ($g/cm^3$) | Exp. ($J/g \cdot K$) | Exp. ($mm^2/s$) | Exp. ($W \cdot m^{-1} \cdot K^{-1}$) |
| Teflon-Al-0.2% CNT | 2.215 | — | 0.945 | 0.187 | 0.287 |
| Teflon-Al-1% CNT | 2.215 | — | 0.917 | 0.126 | 0.257 |
| Teflon-Al-5% CNT | 2.214 | — | 0.979 | 0.133 | 0.289 |
| Teflon-Al-10% CNT | 2.212 | — | 0.945 | 0.158 | 0.331 |
| Teflon-Al-15% CNT | 2.211 | — | 0.962 | 0.147 | 0.312 |
| Teflon-Al-20% CNT | 2.210 | — | 0.983 | 0.187 | 0.405 |

The pellets prepared as described above were charged into the hopper of the extrusion device and transported along a rotating screw inside the cylinder to continuously extrude a product in the shape of a circular wire rod determined by the type of a die installed at the outlet. For reference, in the process of supplying and extruding pellet materials, when heating and melting are carried out for shaping, a temperature control device using electric heat or steam may be attached.

The main parts of the extruder used in this example include a heating device that heats and plasticizes materials, a screw device that pressurizes and moves forward the plasticized materials, and a die that gives a certain shape through the die. Accessory equipment is a conveyor that pulls out shaped products from the die at a stable speed and a device that cools, rolls out, or cuts the shaped products. Oil circulation or electric heat is used for heating. The material of the screw is required to be stronger against wear and more chemically stable than tool steel, so it is plated with hard chrome. The inner wall of the sleeve is surface-hardened.

In the foregoing, the embodiments of the present disclosure have been described with reference to the attached drawings. However, those ordinarily skilled in the art will appreciate that various alternatives, modifications, and equivalents are possible, without changing the spirit or essential features of the present disclosure. Therefore, preferred embodiments of the present disclosure have been described for illustrative purposes, and should not be construed as being restrictive.

What is claimed is:

1. A method of manufacturing a PTC heating element, the method comprising:

(a) preparing a mixed powder of a polymer powder, a carbon nanotube-containing powder and thermally conductive composite particles;

(b) forming the mixed powder into a pellet-shaped body; and (c) extruding the pellet-shaped body to produce a wire-shaped heating element, wherein the thermally conductive composite particles are prepared by stirring and mixing aluminum hydroxide, boron nitride, and an organosiloxane compound represented by $(R_2SiO)_x$ wherein R is a substituted or unsubstituted methyl group, and x is 1 to 20 to prepare a mixture, and then heat-treating the mixture, and wherein the thermally conductive composite particles comprise 69 to 95% by weight of the aluminum hydroxide, 4 to 30% by weight of the boron nitride, and 1 to 2% by weight of the organosiloxane compound represented by the $(R_2SiO)_x$.

2. The method of claim 1, wherein the polymer is (i) a thermoplastic resin selected from fluorine-based resins, acrylic resins, olefin-based resins, vinyl-based resins, and styrene-based resins, or (ii) a thermosetting resin selected from phenolic resins, epoxy resins, and polyimide resins.

3. The method of claim 2, wherein the polymer comprises at least one fluorine-based resin selected from polytetrafluoroethylenes (PTFEs), polychlorotrifluoroethylenes (PCTFEs), polyvinylidenefluorides (PVDFs), polyvinylfluorides (PVFs), perfluoroalkoxy fluororesins (PFAs), and ethylene chlorotrifluoroethylenecopolymers (ECTFEs).

4. The method of claim 1, wherein the carbon nanotube-containing powder is a powder of a composite material obtained by complexation of a carbon nanotube and a metal.

5. The method of claim 4, wherein the metal is any one metal or an alloy of two or more metals selected from a group consisting of Al, Cu, Ti, Mg, K, Ca, Sc, V, Cr, Mn, Fe, Co, Ni, Zn, Ga, Rb, Sr, Y, Zr, Mo, Ru, Rh, Pd, Ag, Cd, In, Sn, Cs, Ba, La, Ce, Nd, Sm, Eu, Gd, Tb, W, Cd, Sn, Hf, Ir, Pt, and Pb.

6. The method of claim 4, wherein the metal is aluminum or an alloy of aluminum.

7. The method of claim 1, wherein in step (b), the pellet-shaped body is produced by charging the mixed powder into a mold and applying heat and pressure to the mixed powder.

8. The method of claim 1, wherein in step (b), the pellet-shaped body is produced by kneading and extruding the mixed powder.

* * * * *